United States Patent [19]
Ishioka

[11] Patent Number: 5,469,282
[45] Date of Patent: Nov. 21, 1995

[54] POWER SUPPLY SYSTEM FOR OPTICAL NETWORK UNIT OF A FIBER IN THE LOOP

[75] Inventor: Yuzuru Ishioka, Kawasaki, Japan

[73] Assignee: Fujitsu Limited, Kanagawa, Japan

[21] Appl. No.: 210,228

[22] Filed: Mar. 17, 1994

[30] Foreign Application Priority Data

Sep. 20, 1993 [JP] Japan .................. 5-230105

[51] Int. Cl.⁶ .................. H04B 10/08; H04M 9/00
[52] U.S. Cl. .................. 359/110; 379/413; 379/399; 379/412
[58] Field of Search .................. 379/412, 413, 379/164, 165, 324, 26, 27, 29, 30, 34, 279, 334, 398, 399; 370/16; 359/110, 171, 137

[56] References Cited

U.S. PATENT DOCUMENTS

| | | | |
|---|---|---|---|
| 4,475,012 | 10/1984 | Coulmanie | 379/412 |
| 5,046,089 | 9/1991 | Pariani et al. | 379/413 |
| 5,054,050 | 10/1991 | Burke et al. | 379/29 |
| 5,163,090 | 10/1992 | Pawlowski et al. | 379/412 |
| 5,222,119 | 6/1993 | Asano | 379/29 |
| 5,323,453 | 6/1994 | Arras et al. | 379/398 |
| 5,323,460 | 6/1994 | Warner et al. | 379/413 |
| 5,349,457 | 9/1994 | Bears | 359/137 |
| 5,367,569 | 11/1994 | Roach et al. | 379/399 |

FOREIGN PATENT DOCUMENTS 62-59494  3/1987  Japan .
62-128261 6/1987  Japan .

Primary Examiner—Leo H. Boudreau
Assistant Examiner—Bhavesh Mehta

[57] ABSTRACT

A power supply system for an optical network unit in a Fiber In The Loop controls an electric current supplied to optical network units, while maintaining currently established communication channels, by prohibiting establishment of further communication channels. Each of the network units are connected to a plurality of subscriber terminals. A remote terminal is provided with a power supply unit. An electric current is supplied to the optical network units from the power supply unit. A current detecting unit, provided to the power supply unit, detects a current supplied to the optical network units, and outputs a current detection signal when the current supplied to the optical network units exceeds a predetermined level. A line interrupting unit, provided in said remote terminal, interrupts a communication line which is currently not in service when the current detection signal is supplied.

9 Claims, 6 Drawing Sheets

POWER SUPPLY SYSTEM FOR OPTICAL NETWORK UNIT OF A FIBER IN THE LOOP

BACKGROUND OF THE INVENTION

1. Field of the Invention

The present invention generally relates to a power supply system, and more particularly to a power supply system for optical network units used in Fiber In The Loop systems.

2. Description of the Prior Art

Several Fiber In The Loop (FITL) systems have already been suggested in the art. A typical FITL system has a construction, for example, comprising an exchange terminal, a remote terminal connected to the exchange terminal via an optical transmission path, and a plurality of optical network units connected to the remote terminal via an optical transmission path. A subscriber (customer) terminal is connected to the corresponding remote terminal via a subscriber line. In such a system, it is suggested to have a power supply system in which electric power for the optical network unit is supplied from the remote terminal. Development of an efficient power supply system is expected.

A description will now be given, with reference to FIG. 1, of a structure of an example of the FITL system. As shown in FIG. 1, the example of the FITL system comprises an exchange terminal 1, a remote terminal (RT) 2, a plurality of optical network units (ONUs) 3, a plurality of subscriber terminals 4, and a power supply unit 6. The exchange terminal 1 is connected with the remote terminal 2 via an optical transmission path. Each of the optical network units 3 is connected to the remote terminal 2 via an optical transmission path 7. Each of the subscriber terminals is connected to the corresponding optical network unit 3 via a subscriber line 5.

The exchange terminal 1 comprises a conversion unit 9 which performs an electrical to optical or optical to electrical conversion, and a path network (NW) 10 which performs an exchanging operation for a signal supplied to/from the conversion unit 9. Additionally, there is provided, between the conversion unit 9 and the path network 10, a multiplexer for multiplexing/demultiplexing the signal.

It is generally the case that the remote terminal 2 has a cross connecting function between the exchange terminal 1 and each of the optical network units 3. For example, in the remote terminal 3, a multiplexed optical signal is converted into an electric signal, and the electric signal is demultiplexed; desired lines are then connected by means of a time slot interchanging operation; the electric signal is multiplexed again and converted into an optical signal; the optical signal is then sent over an optical transmission path.

The optical network units 3 are placed relatively near the subscriber terminals 4. Conventionally, it is general to obtain electric power for the optical network units 3 from commercially available electric lines close to the optical network units 3. Such a system is described in Japanese Laid-Open Patent Applications No.62-59494 and No.62-128261. However, there is a problem in that if there are no electric lines available in the vicinity of an optical network unit, the optical network unit cannot be installed.

In order to eliminate the above-mentioned problem, there is suggested a system in which the remote terminal 2 is provided with a power supply unit 6 so that electric power is supplied from the remote terminal 2 to the optical network units 3 via power supply lines 7. For safety purpose, the power supply unit 6 is provided with a current cutoff unit 8 so that the electric current supplied to the optical network units 3 via the supply lines 7 is cut off when an excessive current is to be supplied to the optical network units 3 so as to protect the power supply unit 6 from overload.

FIG. 2 is a block diagram of the remote terminal 2, the optical network unit 3 and the power supply unit 6 shown in FIG. 1. The remote terminal 2 comprises conversion units 11 and 15, multiplexing/demultiplexing units (MUXs) 12 and 14 and a time slot interchanging unit (TSI) 13. The optical network unit 3 comprises a conversion unit 24, a multiplexing/demultiplexing unit 25, a plurality of subscriber terminal interfaces 26 and a power distribution unit 27. The power supply unit 6 comprises a current detecting unit 18, a power source 19 and a switch 20. The power supply line 7 connects the switch 20 of the power supply unit 6 to the power distribution unit 27 of the optical network unit 3. The conversion unit 15 of the remote terminal is connected to the conversion unit 24 of the corresponding optical network unit 3.

An optical signal input from the exchange terminal 1 (shown in FIG. 1) to the remote terminal 2 is converted into an electrical signal, and supplied to the multiplexing/demultiplexing unit 12. The electric signal is demultiplexed by the multiplexing/demultiplexing unit 12, and supplied to the time slot interchanging unit 13. The time slot interchanging unit 13 can substantially between any two desired lines of the multiplexing/demultiplexing units 12 and 14 by means of a time slot interchanging process. The multiplexing/demultiplexing units 14 and the conversion units 15 are provided to correspond to the number of optical network units 3. The signals multiplexed by each of the multiplexing/demultiplexing units 14 are then converted into optical signals by the conversion unit 15, and then sent to the respective optical transmission paths 22.

In each of the optical network units 3, the optical signal supplied via the optical path 22 is converted into an electrical signal by the conversion unit 24. The electrical signal is then demultiplexed by multiplexing/demultiplexing unit 25 so as to correspond to the subscriber terminal interfaces 26. The electrical signal is converted, by the subscriber terminal interface 26, to analog form in the case that the corresponding subscriber terminal is an analog device.

A signal input from the subscriber terminal to the optical network unit 3 is conversely processed so as to be sent to the optical path 22.

In the optical network unit 3, supply of a loop current for detecting a call signal from a subscriber terminal and sending of a call signal to a corresponding subscriber terminal are performed. Those operations require electric power. Additionally, electric power is also needed to operate the conversion unit 24 and multiplexing/demultiplexing unit 25. The electric power is supplied from the power source 19 of the power supply unit 6 via the current detecting unit 18 and the switch 20 by the power supply line 7. The electric power supplied via the power supply line 7 is distributed to each part of the optical network unit 3 by the distribution unit 27.

In the above-mentioned structure, when it is detected by the current detecting unit 18 that the electric current supplied to the optical network unit 3 exceeds a predetermined level, the switch is turned off so that the current supplied to the optical network unit 3 is cut off so as to protect the power supply unit 6 from overload. In order to achieve the above-mentioned overload protection system, the current detecting unit 18 and the switch 20 may be provided for each optical network unit 3.

In the above-mentioned conventional FITL system, when some subscriber terminals 3 connected to one optical network unit are in a communicating state and when a plurality of call-in signals and call-out signals are generated for the particular optical network unit 3 at the same time, there may occur a case where the current supplied to the optical network unit 3 from the power supply unit 6 is increased and finally exceeds the predetermined level. In such a case, the switch 20 is turned off in accordance with a detection signal supplied by the current detecting unit 20. Thereby, the power supply unit 6 can be protected from overload.

However, there is a problem in that the optical network unit 3 drops out of service when the electric current from the power supply unit 6 is cutoff, resulting in all communication channels corresponding to the optical network unit 3 being broken. In a case where a single common current detecting unit 18 and switch 20 combination is provided for all optical network units 3, a great number of currently established communication channels through a plurality of optical network units 3 are suddenly broken without warning.

SUMMARY OF THE INVENTION

It is a general object of the present invention to provide an improved and useful power supply system for an optical network unit in a Fiber In The Loop, in which power supply system the above-mentioned disadvantages are eliminated.

A more specific object of the present invention is to provide a power supply system for an optical network unit in a Fiber In The Loop which power supply system can control a current supplied to the optical network unit, while maintaining currently established communication channels, by prohibiting establishment of further communication channels.

In order to achieve the above-mentioned objects, according to the present invention, there is provided a power supply system for an optical network unit in a Fiber In The Loop system which comprises a remote terminal provided with a power supply unit and an optical network unit connected to a plurality of subscriber terminals, an electric current being supplied to the optical network unit from the power supply unit, the power supply system comprising:

a current detecting unit, provided to the power supply unit, for detecting a current supplied to the optical network unit, and outputting a current detection signal when the current supplied to the optical network unit exceeds a predetermined level; and a line interrupting unit, provided in the remote terminal, for interrupting a communication line which is currently not in service when the current detection signal is supplied, the communication line being one of a plurality of lines provided to correspond respectively to the subscriber terminals so that communication signals are transmitted through the communication line.

Other objects, features and advantages of the present invention will be more apparent from the following detailed description when read in conjunction with the accompanying drawings.

DETAILED DESCRIPTION OF THE PREFERRED EMBODIMENTS

Figure 1:
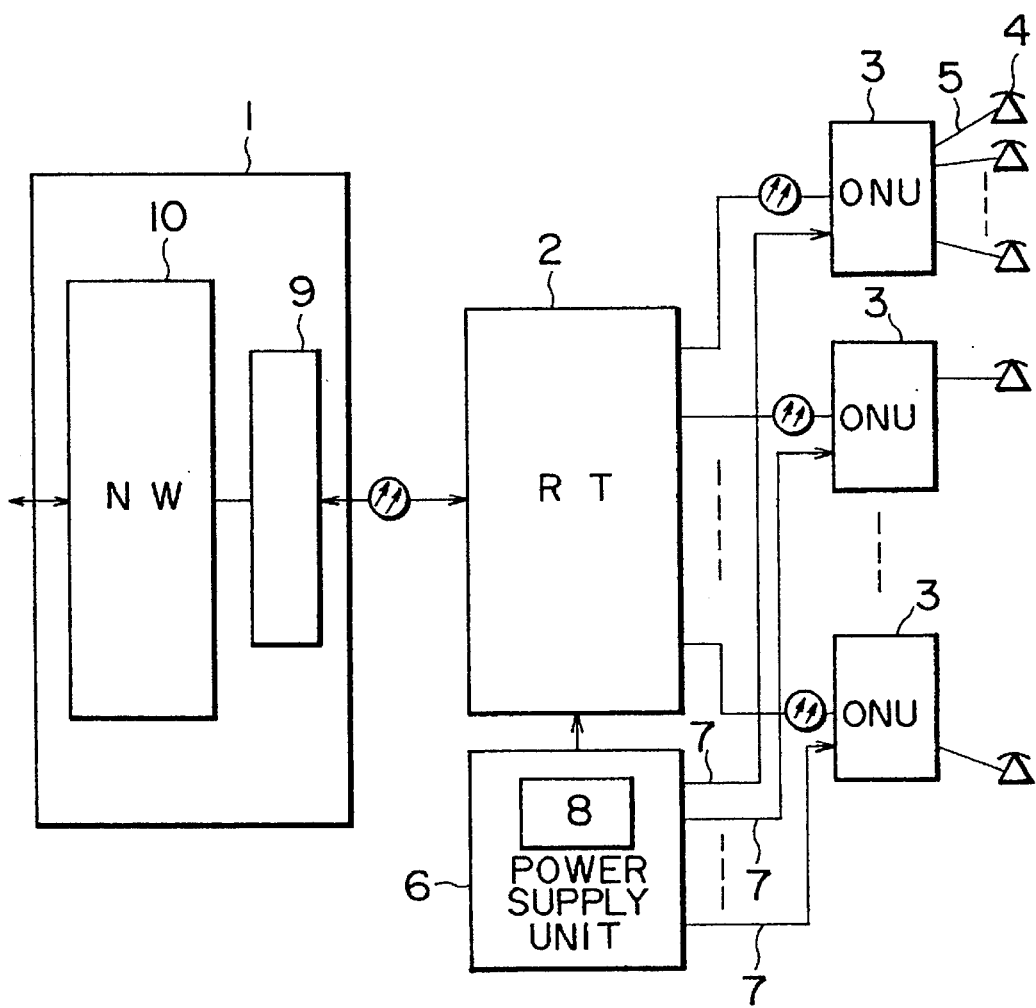
FIG. 1 is an illustration of a structure of an example of a Fiber In The Loop system.
Figure 2:
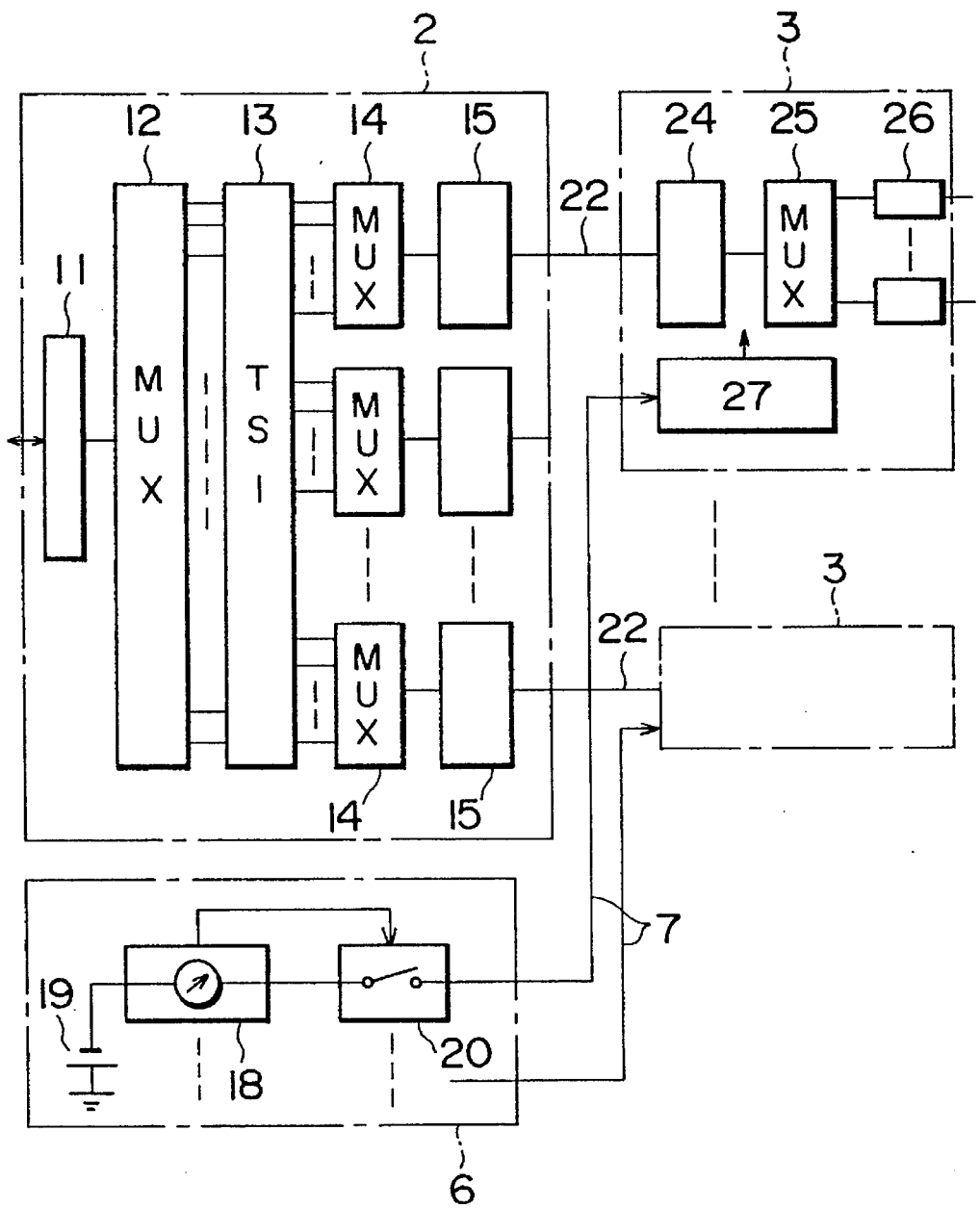
FIG. 2 is a block diagram of a remote terminal, an optical network unit and a power supply unit shown in FIG. 1.
Figure 3:
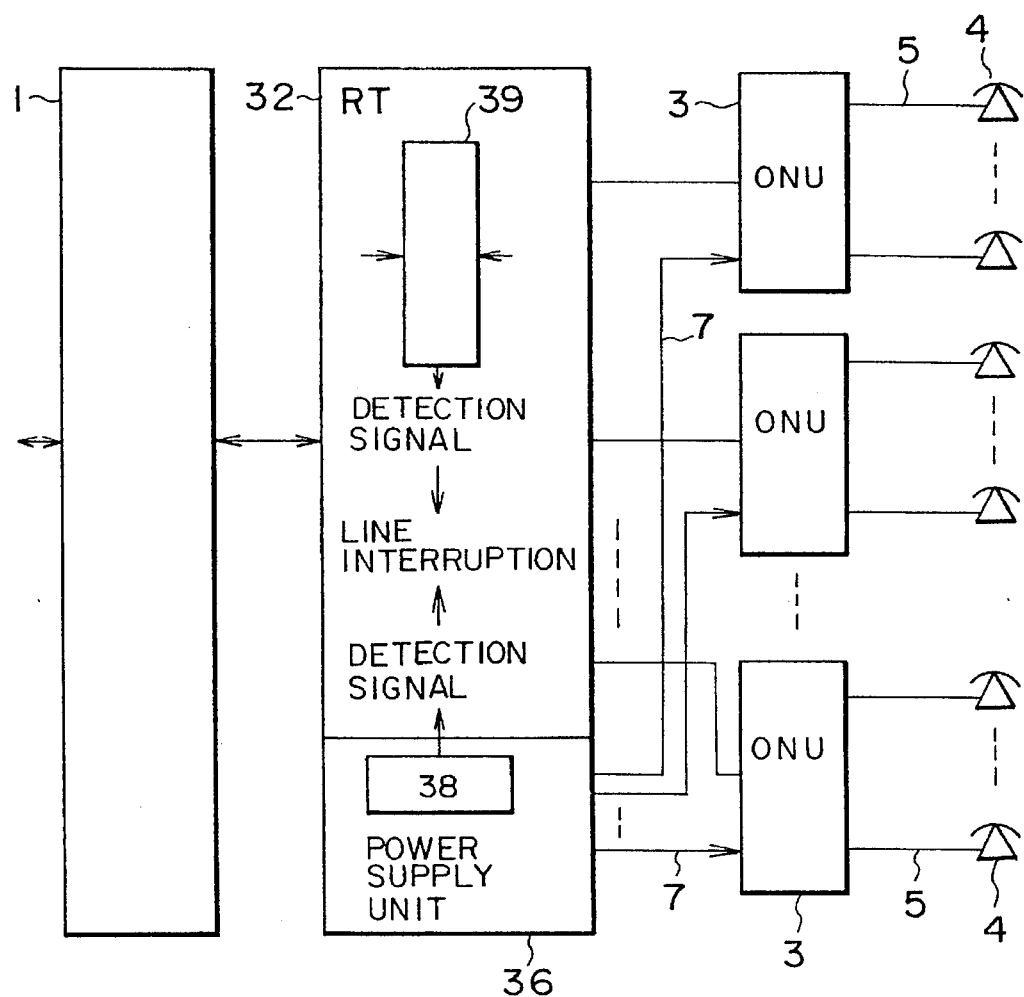
FIG. 3 is an illustration for explaining the principle of the present invention.

A description will now be given, with reference to FIG. 3, of the principle of the present invention. FIG. 3 is an illustration of a structure of a FITL system in which a power supply system according to the present invention is adopted. In FIG. 3, parts that are the same as the parts shown in FIG. 1 are given the same reference numerals, and descriptions thereof will be omitted.

A power supply system according to the present invention comprises a power supply unit 36 which has a current detecting unit 38 and line interrupting means for interrupting communication lines provided in the remote terminal 32. When the current supplied to the optical network units 3 exceeds a predetermined level, the current detecting unit 38 sends a signal to the line interrupting means. The remote terminal 32 determines that, when the signal is supplied by the current detecting unit 38, call traffic is high in the optical network unit 3. In accordance with the determination, the line interrupting means interrupts lines which are not currently in service, resulting in prevention of transmission of a call-in signal and a call-out signal. Accordingly, the current supplied to the optical network units 3 does not increase further, and thus the overloading of the power supply unit can be prevented.

Figure 4:
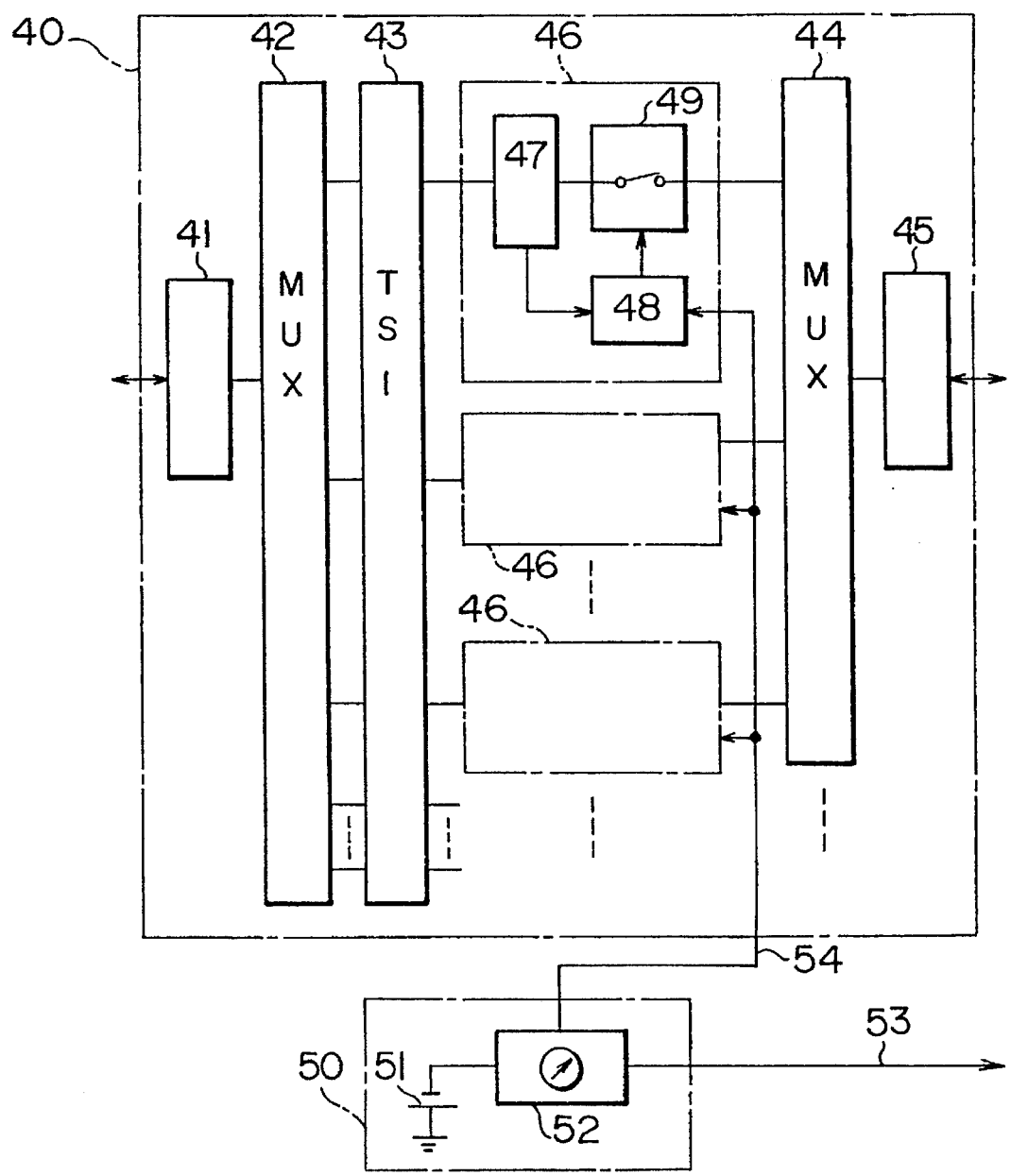
FIG. 4 is a block diagram of an essential part of a first embodiment according to the present invention.

A description will now be given, with reference to FIG. 4, of a first embodiment according to the present invention. FIG. 4 shows an essential part, including a remote terminal 40 and a power supply unit 50, of the first embodiment according to the present invention.

A FITL system to which the present embodiment is applied is constituted by connecting a conversion unit 41 with an exchange terminal (not shown in the figure) via an optical transmission path, and connecting a conversion unit 45 with an optical network unit (not shown in the figure) via an optical transmission unit. The optical network unit is connected, as shown in FIG. 3, to a plurality of subscriber terminals.

An optical signal input from the exchange terminal to the remote terminal 40 is converted into an electrical signal, and supplied to a multiplexing/demultiplexing unit 42. The electric signal is demultiplexed by the multiplexing/demultiplexing unit 42 and supplied to a time slot interchanging unit 43. The time slot interchanging unit 43 can substantially connect between any desired lines of the multiplexing/demultiplexing units 42 and a multiplexing/demultiplexing unit 44 by means of a time slot interchanging process known to the art. The multiplexing/demultiplexing units 44 and conversion units 45 are provided to correspond in number to the optical network units. The signals multiplexed by each of the multiplexing/demultiplexing units 44 are then converted into optical signals by the conversion units 45 and then sent to the respective optical transmission paths.

A signal input from the optical network unit to the conversion unit 45 of the remote terminal 40 is conversely processed so as to be sent to the exchange terminal.

In the remote terminal 40, there is provided a line interrupting unit 46 on each of the lines, between the time slot interchanging unit 43 and the multiplexing/demultiplexing unit 44. Each of the line interrupting units 46 comprises a control signal detecting unit 47, a relay controlling unit 48 and a relay 49.

The power supply unit 50 comprises a power source 51 and a current detecting unit 52. An electric current is supplied from the power source to the optical network unit via the current detecting unit 52 and power supply line 53. The current supplied to the optical network unit is measured by the current detecting unit 52, and when the current exceeds a predetermined level, a detection signal is sent to the relay controlling unit 48 of the line interrupting units 46 via a detection signal supply line 54.

It should be noted that the current detecting unit 52 may be constructed in various known forms, such as a form in which the value of the direct current supplied by the power source 51 is measured and compared with a predetermined value to generate a detection signal when the value of the measured current exceeds the predetermined value and the detection signal is sent to the line interrupting unit 46 via the detection signal supply line 54.

In the above-mentioned structure of the present invention, a control signal including a call-in signal or a call-out signal is detected by the control signal detecting unit 47. The control signal comprises a plurality of bits in accordance with a predetermined format. Therefore, the control signal detecting unit 47 of the line interrupting unit 46 may take a form in which the control signal is detected by means of a logic circuit or by means of a software routine executed by a processor. Additionally the relay controlling unit 48 of the line interrupting unit 46 turns off the relay 49 by means of a signal generated by an AND operation performed on the detection signal supplied by the current detecting unit 52 and the control signal supplied by the control signal control unit 47. When a normally-on type relay is adopted for the relay 49, the relay 49 should be turned off in accordance with the signal resulting from the AND operation.

Accordingly, when the current supplied by the power supply unit 50 exceeds the predetermined level, a line in which a call-in signal or a call-out signal is detected can be interrupted by the relay 49. therefore, no further connections are established after the time when the current supplied by the power supply unit 50 exceeds the predetermined level, and thus an increase of electric power consumption by the optical network unit can be prevented.

It should be noted that the relay 49 which has been turned off to interrupt the line may be returned to the on state, when the detection signal is no longer present, under a control of the relay controlling unit 48. Additionally, the relay 49 may be returned to the on state after a preset time has elapsed by means of a timer.

In the above-mentioned FITL system in which the power supply system of the present embodiment is applied, when call-in is made for a plurality of subscriber terminals at the same time, a plurality of call-in signals are sent from the corresponding subscriber terminal interfaces. Accordingly, power consumption by the optical network units increases, and thus a high current flows in the power supply line 53. The current detecting unit 52 detects the high current level, and sends the detection signal to the relay controlling unit 48 when the current is greater than a predetermined level. At the same time, a call-in signal is detected by the control signal detecting unit 47, and the detection signal is supplied to the relay controlling signal 48. Accordingly, the relay 49 is turned off by the relay controlling unit 48, that is, the relay 49 interrupts the line on which the call-in signal is detected. Thereby, the sending of the call-in signal by the subscriber terminal interface of the optical network unit is stopped, and thus an increase of the current supplied from the power supply unit 50 to the optical network unit can be prevented. It should be noted that since a call-in signal is not detected on a line which is currently in service and the corresponding relay 49 is not turned off, the lines currently in service can remain in service.

The current supplied to the remote terminal also increases when call-out is made by a plurality of subscriber terminals at the same time. In such a case, since a line on which a call-out signal is detected by the control signal detecting unit 47 is interrupted by the relay 49 when the detection signal is supplied by the current detecting unit 52, an increase of the current supplied to the optical network unit can be prevented. It should be also noted that since a call-out signal is not detected on a line which is currently in service and the corresponding relay 49 is not turned off, the line currently in service can be remain in service.

Figure 5:
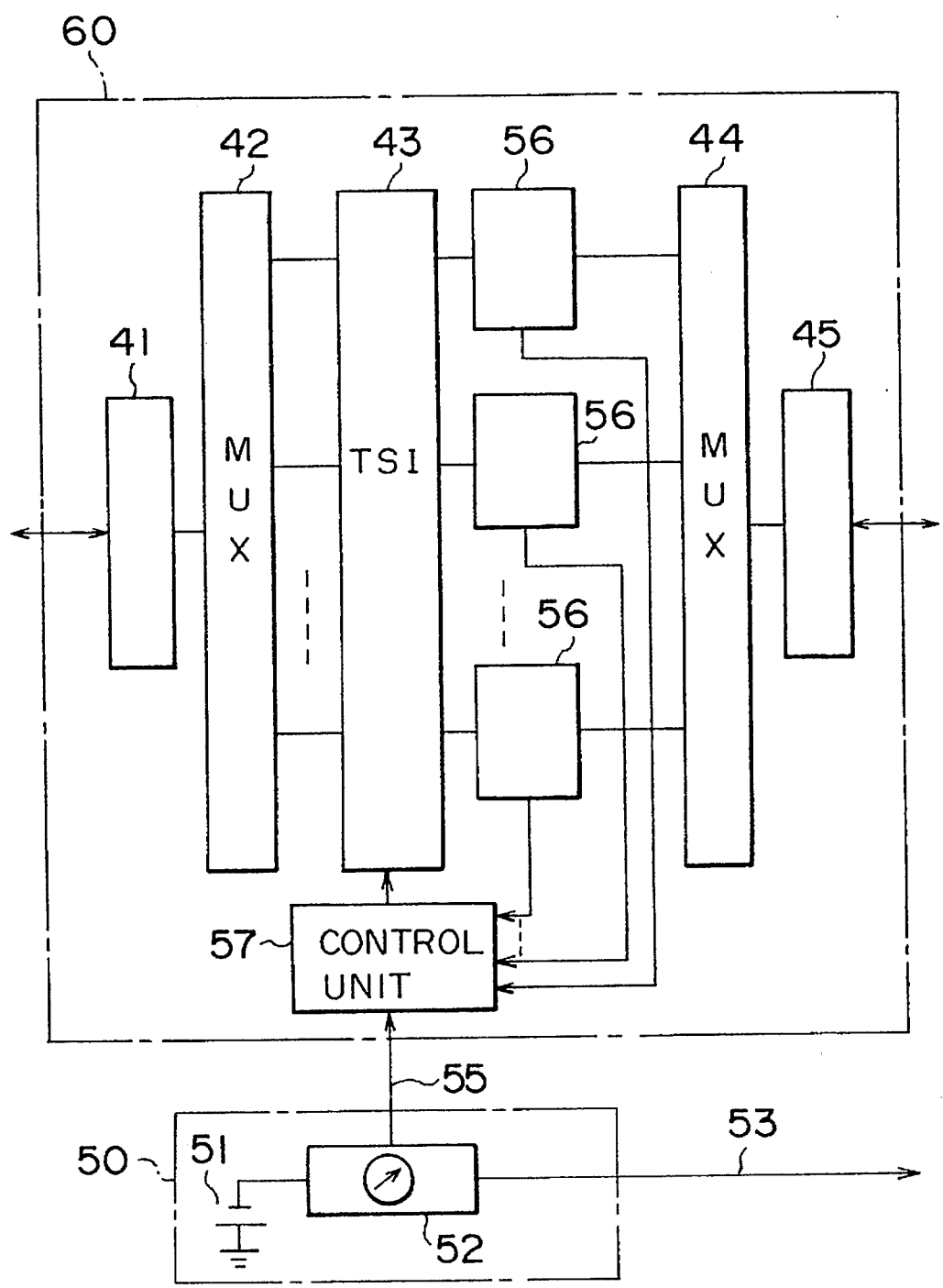
FIG. 5 is a block diagram of an essential part of a second embodiment according to the present invention.

A description will now be given, with reference to FIG. 5, of a second embodiment according to the present invention. FIG. 5 shows an essential part, including a remote terminal 60 and a power supply unit 50, of the first embodiment according to the present invention. In FIG. 5, the parts that are the same as the parts shown in FIG. 4 are given the same reference numerals, and descriptions thereof will be omitted.

In the present embodiment, the detection signal detected by the current detecting unit 52 is supplied, unlike in the first embodiment, to a control unit 57 via a detection signal supply line 55. Additionally, a control signal detecting unit 56, which detects a control signal and outputs a detection signal when the control signal is detected, is provided on each line between the time slot interchanging unit 43 and the multiplexing/demultiplexing unit 44.

The control unit 57 controls the time slot interchanging unit 43 so that a time slot is not assigned to a line on which a control signal is detected in accordance with result of an AND operation performed on the detection signal supplied by the current detecting unit 52 and the detection signal supplied by the control signal detecting unit 56. A line which is not assigned a time slot cannot transmit any signals, and thus such a state of the line corresponds to a state where the line is interrupted. Therefore, the present embodiment has the same effect as that of the first embodiment mentioned above without having an additional part such as a relay of the first embodiment. It should be noted that since a time slot is continuously assigned for a line currently in service, the line currently in service can remain in service.

Figure 6:
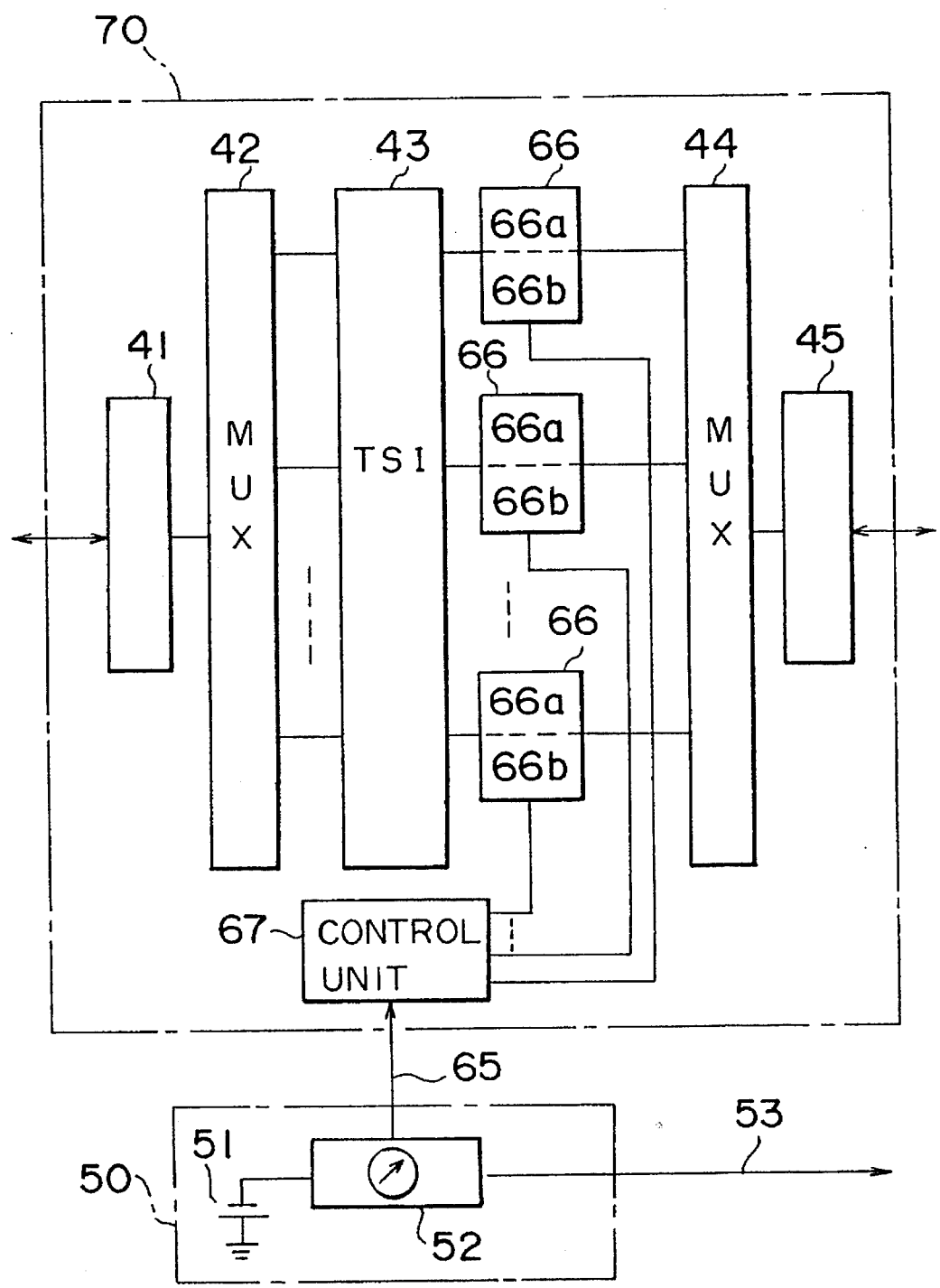
FIG. 6 is a block diagram of an essential part of a third embodiment according to the present invention.

A description will now be given, with reference to FIG. 6, of a third embodiment according to the present invention. FIG. 6 shows an essential part, including a remote terminal 70 and a power supply unit 50, of the third embodiment according to the present invention. In FIG. 6, the parts that are the same as the parts shown in FIG. 4 are given the same reference numerals, and descriptions thereof will be omitted.

In the present embodiment, the detection signal detected by the current detecting unit 52 is supplied, similarly to the second embodiment, to a control unit 67 via a detection signal supply line 65. Additionally, a control signal processing unit 66, which comprises a control signal detecting unit 66a and a control signal converting unit 66b, is provided on each line between the time slot interchanging unit 43 and the multiplexing/demultiplexing unit 44. The control signal detecting unit 66a detects a control signal, and outputs a detection signal when the control signal is detected. The control signal converting unit 66b converts a control signal into an idle signal under the control of the control unit 67.

When the detection signal from the current detecting unit 52 and the detection signal from the control signal processing unit 66 are supplied to the control unit 67 at the same time, the control unit 67 controls the control signal converting unit 66b of the control signal processing unit 66 to convert the control signal into an idle signal. Accordingly, the idle signal is sent, instead of the control signal, to the optical network unit when the detection signal is supplied by the current detecting unit 52. When an idle signal is being received, the optical network unit cannot recognize that there is a call-in signal on the corresponding line. Accordingly, the optical network unit does not perform a calling operation for the subscriber terminal, and thus an increase of an electric power consumption by the optical network unit is prevented. Therefore, the present embodiment has the same effect as that of the aforementioned first embodiment, using a simple signal processing. It should be noted that since there are no effects on a line currently in service, the line currently in service can be remain in service.

The present invention is not limited to the specifically disclosed embodiments, and variations and modifications may be made without departing from the present invention.

What is claimed is:

1. A power supply system for an optical network unit in a Fiber In The Loop system which comprises a remote terminal provided with a power supply unit and an optical network unit connected to a plurality of subscriber terminals, an electric current being supplied to the optical network unit from the power supply unit via a power supply line, said power supply system comprising:

current detecting means, provided to said power supply unit, for detecting a current supplied from said power supply unit to said optical network unit via said power supply line, said current increasing in response to an increase in a number of said subscriber terminals currently being in a communication state, said current detecting means outputting a current detection signal when the current supplied to said optical network unit exceeds a predetermined level; and line interrupting means, provided in said remote terminal, for interrupting only those communication lines which are currently not in the communication state when said current detection signal is supplied by said current detecting means, said communication lines being one of a plurality of lines provided to correspond respectively to the subscriber terminals so that communication signals are transmitted through the communication lines.

2. The power supply system as claimed in claim 1, wherein said line interrupting means comprises a line interrupting unit which interrupts the communication line on which a control signal including a call-in signal and a call-out signal is being transmitted, said call-in signal being received from an exchange terminal and directed to one of said subscriber terminals, said call-out signal being transmitted by one of said subscriber terminals and received from said optical network unit.

3. The power supply system as claimed in claim 2, wherein said line interrupting unit is provided on the communication line between a time slot interchanging unit and a multiplexing/demultiplexing unit, said time slot interchanging unit performing a time slot interchanging operation for the communication signals transmitted through the communication line, said multiplexing/demultiplexing unit multiplexing the communication signals output to said optical network unit and demultiplexing the communication signals input from said optical network unit.

4. The power supply system as claimed in claim 3, wherein said line interrupting unit comprises:

a relay which interrupts said communication line;

a control signal detecting unit which detects said control signal on said communication line, and outputs a control signal detection signal; and a relay controlling unit which controls said relay so that said relay interrupts said communication line when said current detection signal and said control signal detection signal are supplied to said relay controlling unit at the same time.

5. The power supply system as claimed in claim 1, wherein said line interrupting means comprises a time slot interchanging unit, a control signal detecting unit and a control unit, and wherein said time slot interchanging unit performs a time slot interchanging operation on said communication signals transmitted through said communication line, said control signal detecting unit detecting a control signal transmitted through said communication line and sending a control signal detection signal to said control unit, said control unit controlling said time slot interchanging unit so that a time slot is not assigned to a communication line on which said first detection signal is detected when said control signal detection signal and said current detection signal are supplied to said control unit at the same time.

6. The power supply system as claimed in claim 5, wherein said control signal detecting unit is provided on said communication line between said time slot interchanging unit and a multiplexing/demultiplexing unit multiplexing the communication signals output to said optical network unit and demultiplexing the communication signals input from said optical network unit.

7. The power supply system as claimed in claim 1, wherein said line interrupting means comprises a control signal processing unit and a control unit, and wherein said control unit controls said control signal processing unit so that a control signal, transmitted through said communication line currently not in a communication state is converted into an idle signal when said current detection signal is detected, said optical network unit maintaining a waiting state when said idle signal is input so that an communication channel is not established for said communication line on which said control signal has been detected.

8. The power supply system as claimed in claim 7, wherein said control signal processing unit comprises a control signal detecting unit and a control signal converting unit, said control signal detecting unit detecting said control signal and sending to said control unit a control signal detection signal, said control unit controlling said control signal converting unit so that said control signal is converted into said idle signal when said current detecting signal and said control signal detection signal are detected at the same time.

9. The power supply system as claimed in claim 7, wherein said control signal processing unit is provided on said communication line between a time slot interchanging unit and a multiplexing/demultiplexing unit, said time slot interchanging unit performing a time slot interchanging operation for the communication signals transmitted through the communication line, said multiplexing/demultiplexing unit multiplexing the communication signals output to said optical network unit and demultiplexing the communication signals input from said optical network unit.

* * * * *